United States Patent [19]
Zakikhani et al.

[11] Patent Number: 6,111,061
[45] Date of Patent: *Aug. 29, 2000

[54] POLYMER COMPOSITIONS

[75] Inventors: Mohsen Zakikhani, Birmingham; Karen Sarah Mitchie, Bromsgrove, both of United Kingdom

[73] Assignee: Albright & Wilson UK Limited, West Midlands, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,166

[22] Filed: May 8, 1997

[30] Foreign Application Priority Data

May 14, 1996 [GB] United Kingdom .................. 9610070

[51] Int. Cl.$^7$ .................................... C08G 79/02
[52] U.S. Cl. ......................... 528/400; 528/398; 528/486; 528/503
[58] Field of Search ..................................... 528/398, 400, 528/486, 503

[56] References Cited

U.S. PATENT DOCUMENTS

| | | | |
|---|---|---|---|
| 3,764,570 | 10/1973 | Heckles | 280/2.5 R |
| 5,523,023 | 6/1996 | Kleinstück et al. | 252/542 |
| 5,538,957 | 7/1996 | Tsaklakidis et al. | 514/114 |

*Primary Examiner*—Duc Truong
*Attorney, Agent, or Firm*—Frishauf, Holtz, Goodman, Langer & Chick, P.C.

[57] ABSTRACT

A polymer composition including phosphorus substituents which comprises:
 (a) a phosphono-substituted carboxylic acid or an ester of such acid; and
 (b) a mono- or polyfunctional entity polymerizable with (a).

Substances suitable for use as (a) are aliphatic or aromatic phosphono substituted dicarboxylic acids or esters thereof.

Substances suitable for use as (b) are polyhydric alcohols, aliphatic mononuclear or polynuclear aromatic polycarboxylic acids or esters or anhydrides thereof. Also suitable for use as (b) are aliphatic or aromatic polyamines and aliphatic or aromatic polyisocyanates or polyepoxides.

7 Claims, No Drawings

POLYMER COMPOSITIONS

This invention relates to polymer compositions, in particular to polymer compositions including phosphono-substituents.

Accordingly, the present invention provides a polymer composition comprising:
(a) a phosphono-substituted carboxylic acid or an ester of such acid; and
(b) a mono- or polyfunctional entity polymerisable with (a).

Suitably, (a) may be an aliphatic or aromatic phosphono-substituted dicarboxylic acid or an ester of such an acid, for example phosphono-succinic acid or its dimethyl ester.

The entity (b) may be a polyhydric alcohol.

Suitably, (b) may be an aliphatic or cycloaliphatic dihydric alcohol, such as ethylene glycol, propylene glycol, neopentyl glycol or 1,4-dimethylol cyclohexane.

Alternatively, (b) may be a trihydric alcohol such as glycerol.

Again, (b) may be a n aliphatic, mononuclear aromatic or polynuclear aromatic polycarboxylic acid, or an ester or anhydride of such acid.

Thus, (b) may be succinic acid, terephthalic acid, phthalic anhydride, naphthaic acid or naphthalic anhydride.

Further (b), may be an aliphatic or aromatic polyamine (e.g. ethylene diamine) or an aliphatic or aromatic polyisocyanate or polyepoxide.

The present invention will be illustrated, merely by way of example, as follows:

EXAMPLE 1 TO 3

The following polyester compositions were made, using phosphono-succinic acid and various polyhydric alcohols:
Example 1: neopentyl glycol (NPG)
Example 2: 1,4-dimethylol cyclohexane (CHDM)
Example 3: ethylene glycol (EG)

1.1 Procedure

Equimolar amounts of phosphono-succinic acid and of each of the above-mentioned diols were charged to a 100 ml round-bottomed flask and allowed to react at about 160° C. for several hours while monitoring the acid number, until a very viscous liquid was produced.

1.2 Results

The apparent molecular weights, measured by gel-permeation chromatography, are shown in the Table (below). These values are approximate as the polymers are very polar. The actual molecular weight would be expected to be higher.

| EXAMPLE | Diol | $M_w$ (a) |
| --- | --- | --- |
| 1 | NPG | 9,638 |
| 2 | CHDM | 1,162 |
| 3 | EG | 19,004 |

(a) weight-average molecular weight

EXAMPLES 4 AND 5

Phosphono-succinic acid-terminated polyesters were made as follows:

2.1 Poly(oxyneopentyl succinate)—Phosphonoscuccinic Acid Terminated 2.1.1 Procedure Neopentyl glycol (81.797 g, 0.786 mol) and succinic anhydride (77.000 g, 0.769 mol) were charged to a 250 ml resin pot fitted with a mechanical stirrer, temperature probe, nitrogen inlet and distillation apparatus. The mixture was stirred and heated to 160° C. by means of an isomantle. Once the mixture had melted, nitrogen was bubbled through it. The mixture was heated from 160 to 190° C. over 40 h. A sample of the resulting intermediate product was taken after this time.

The temperature was then lowered to 100° C. and phosphono-succinic acid (3.078 g, 0.016 mol) added. The mixture was heated at 160° C. for 5.5 h before being allowed to cool to room temperature. The product was crystallised from ethyl acetate to give a fine white powder. 2.1.2 Results Gel-permeation chromatography of the intermediate product indicated the molecular weight of the product was about 20,000 gmol$^{-1}$.

2.2 Poly(oxyneopentyl phthalate)—Phosphonosuccinic Acid Terminated

A similar procedure to that described in 2.1.1 was used, replacing the succinic anhydride with phthalic anhydride.

A solid polymer with emulsifying properties was produced.

Polymer compositions according to the present invention may be used as dispersing agents, e.g. for pigments or for fillers, especially in connection with the manufacture of ceramics. The polymer compositions may also be used in place of surfactants in the production of polymer coatings. They perform the same function as surfactants in such an application, but unlike surfactants, do not tend to "migrate" to the surface of the polymer coating.

What is claimed is:
1. A polymer consisting essentially of a polyester which is the reaction product of a phosphono-substituted carboxylic acid and a polyhydric alcohol.
2. The polymer of claim 1, wherein said phosphono-substituted carboxylic acid is phosphono-succinic acid.
3. The polymer of claim 2, wherein said polyhydric alcohol is neopentyl glycol.
4. The polymer of claim 2, wherein said polyhydric alcohol is 1,4-dimethylol cyclohexane.
5. The polymer of claim 2, wherein said polyhydric alcohol is ethylene glycol.
6. The polymer of claim 1, wherein said reaction product is formed by reaching equivalent amounts of phosphono-substituted carboxylic acid and said polyhydric alcohol to form said polyester.
7. A polymer consisting essentially of a polyester which results from the following reactions approximately equal molar amounts of neopentyl glycol and succinic anhydride or phthalic anhydride are reacted by heating from 160° C. to 190° C. over 40 hours; thereafter the temperature was lowered and phosphono-succinic acid was added for reaction at 160° C. for 5.5 hours to form the polyester.

* * * * *